United States Patent
Derr et al.

(10) Patent No.: US 10,884,631 B2
(45) Date of Patent: Jan. 5, 2021

(54) METHOD FOR PRELOADING DATA

(71) Applicant: Bull SAS, Les-Clayes-Sous-Bois (FR)

(72) Inventors: Simon Derr, Fontaine (FR); Gaël Goret, La Murette (FR); Grégoire Pichon, Seyssins (FR)

(73) Assignee: Bull SAS

( * ) Notice: Subject to any disclaimer, the term of this patent is extended or adjusted under 35 U.S.C. 154(b) by 0 days.

(21) Appl. No.: 16/227,951

(22) Filed: Dec. 20, 2018

(65) Prior Publication Data
US 2019/0187919 A1 Jun. 20, 2019

(30) Foreign Application Priority Data
Dec. 20, 2017 (FR) ..................................... 17 62659

(51) Int. Cl.
| | |
|---|---|
| *G06F 3/06* | (2006.01) |
| *G06F 12/0888* | (2016.01) |
| *G06F 12/0862* | (2016.01) |
| *G06F 12/0866* | (2016.01) |

(52) U.S. Cl.
CPC ............ *G06F 3/0613* (2013.01); *G06F 3/064* (2013.01); *G06F 3/067* (2013.01); *G06F 3/0629* (2013.01); *G06F 12/0862* (2013.01); *G06F 12/0866* (2013.01); *G06F 12/0888* (2013.01); *G06F 2212/463* (2013.01); *G06F 2212/6024* (2013.01)

(58) Field of Classification Search
None
See application file for complete search history.

(56) References Cited

U.S. PATENT DOCUMENTS

| | | | | |
|---|---|---|---|---|
| 7,716,425 | B1 | 5/2010 | Uysal et al. | |
| 2007/0094452 | A1* | 4/2007 | Fachan | ............... G06F 12/0862 |
| | | | | 711/137 |
| 2007/0106849 | A1* | 5/2007 | Moore | ................... G06F 16/172 |
| | | | | 711/137 |
| 2007/0185933 | A1* | 8/2007 | Dao | ........................ G06F 3/061 |
| 2009/0132760 | A1* | 5/2009 | Flynn | ..................... G06F 3/0604 |
| | | | | 711/113 |
| 2010/0115211 | A1* | 5/2010 | de la Iglesia | ....... G06F 11/3485 |
| | | | | 711/154 |
| 2012/0166734 | A1* | 6/2012 | Zeidner | ............... G06F 12/0862 |
| | | | | 711/137 |
| 2018/0165018 | A1* | 6/2018 | Glover | ................... G06F 3/0611 |

FOREIGN PATENT DOCUMENTS

CN 107168891 A 9/2017

* cited by examiner

*Primary Examiner* — Michael Alsip
(74) *Attorney, Agent, or Firm* — St. Onge Steward Johnston & Reens, LLC

(57) ABSTRACT

The method for preloading data of a file containing the following steps of defining a plurality of bins of predetermined sizes in a file, for each input and/or output operation executed on the file, determining the bin involved in the operation, counting the number of input and/or output operations executed in each bin of the file by taking into account only a predetermined number of last operations on the whole file, and when the sum of the operations counted in a bin is greater than a predetermined threshold, loading, in a memory medium, at least one area of the file determined on the basis of this bin.

21 Claims, 2 Drawing Sheets

METHOD FOR PRELOADING DATA

FIELD OF THE INVENTION

The invention relates to a method for preloading data.

BACKGROUND OF THE INVENTION

One of the problems posed in the context of applications requiring high-performance computation (HPC) lies in efficient access to data. Distributed computation and storage architectures often encounter latencies due to significant data access times, the processing speed of the microprocessors often being faster than the routing of the data in the central memory.

Cache memories make it possible to avoid these latencies, under the condition that the data required for the processors are present in the caches at the right time. This condition may be fulfilled by virtue of methods for preloading data. These preloading operations are hardware or software optimizations that aim to place data in the cache before the processor requests them, thus making it possible to avoid memory latency and to increase performance. It therefore involves predicting in advance that they will be the future requests.

A method for predicting future access operations in a file consists in detecting a logic sequence in the access operations to the file so as to predict, on the basis of the previous access operations, what the next access operations to the file will be, and to put these access operations in the cache memory before they are requested by the processor.

This method exhibits numerous drawbacks. In particular, it does not make it possible to take into account multiple access operations that do not have a logic relationship with one another. Moreover, it does not make it possible to take into account the dynamic evolution of the access operations in real time based on a low volume of data.

SUMMARY OF THE INVENTION

One aim of the invention is therefore to improve the methods for preloading data of a file.

To this end, according to the invention, there is provided a method for preloading data of a file, comprising the following steps:

defining a plurality of bins of predetermined sizes in a file, for each input and/or output operation executed on the file, determining the bin involved in the operation, counting the number of input and/or output operations executed in each bin of the file by taking into account only a predetermined number of last operations on the whole file, and when the sum of the operations counted in a bin is greater than a predetermined threshold, loading, in a memory medium, at least one area of the file determined on the basis of this bin.

Thus, in real time, a sliding sequence comprising a determined number of last operations is taken into account, and each operation is recorded in a bin. The use of a sequence of consecutive operations makes it possible to take into account the temporal aspect of the access operations, without necessarily strictly taking account of their order. It may be provided, depending on the density of the operations over time, for it to be possible to adjust the size of the sliding sequence.

Indexing the operations by bin is performed by way of the integer division of the offsets (distance between the start of the file and the loaded data) of the operations by the size of the bins. It may of course be provided that this indexing is performed using any technique known to those skilled in the art.

Identifying the bins of the file makes it possible to take into account the spatial aspect of the access operations.

Coupling the two access operation characteristics, spatial and temporal, provides decisive elements for performing multifactorial analysis and offering an effective prediction. The analysis is thus performed in real time and is based on a low volume of data.

Furthermore, this method makes it possible to detect areas to be preloaded during access operations in multiple (and separate) areas without a regular form. For example, a process simultaneously looking for data in a plurality of separate areas of a file will benefit from the preloading in these areas in the memory, which is not the case in methods from the prior art.

Once the area of the file has been loaded, future access operations in this area will benefit from the cache effect, since their data will already be in memory.

The memory medium may in particular be a cache memory medium.

The input and/or output operations performed by a given process for a given file are obtained by intercepting a set of system functions such as read, write, pread, pwrite, open, close, etc. Each of the operations may be described by a quintuplet including:

a file descriptor, an active process number in read/write, a timestamp, an offset (distance between the start of the file and the loaded data), and the size of the loaded data.

Advantageously, the method furthermore comprises the following steps:

identifying at least one group of adjacent bins for which at least one input and/or output operation has been counted, and when the sum of the operations counted in the group of bins is greater than the predetermined threshold, loading, in the memory medium, at least one area of the file determined on the basis of this group of bins.

Grouping together the adjacent bins (or contiguous bins) is advantageous in that it eliminates the impact of the bin boundaries (edge effect) in the identification of the most-accessed areas of the file. In the same way as for the bins, once the area of the file has been loaded, the future access operations in this area will benefit from the cache effect, since their data will already be in memory.

Advantageously, the method is implemented during the execution of an application.

The method is thus implemented in real time.

Preferably, the predetermined number of last operations taken into account is an integer between 10 and 1000, preferably between 10 and 200.

The sliding sequence of the last operations that are executed thus has a small size, thereby making it possible to take account of the temporal aspect and therefore to have dynamic tracking of the operations that are executed. It may be provided for this number to be between 30 and 170, preferably between 50 and 150, for example between 80 and 120.

Preferably, the size of the bins is between 1 MB and 100 MB, preferably between 1 MB and 10 MB.

A small bin size makes it possible to obtain greater accuracy for the areas in which the access operations are highest in number.

Advantageously, the bins have the same size.

It may be provided that the predetermined threshold triggering loading is between 2 and 100 operations, preferably between 4 and 10 operations.

It may be provided for this threshold to be chosen from 1, 2, 3, 4, 5, 6, 7, 8, 9 or 10 operations. It may of course be provided for this threshold to be higher, for example between 10 and 20. A low threshold makes it possible to store more file areas in memory, thus improving the probability of a future access operation to the file taking place in a preloaded area.

Advantageously, the area of the file is centered on a median of the positions of at least some of the operations involving the bin or the group of bins.

Preferably, the area of the file is centered on a median of the positions of the last 2 to 10 operations involving the bin or the group of bins.

By taking into account only a small number of the last operations executed, centering is achieved that follows the trend of the last access operations to the file.

In one embodiment, a position of the area of the file is determined as follows:

identifying a predetermined number of last input and/or output operations involving the bin or the group of bins that has reached the predetermined threshold for triggering loading and indexing them according to their order of arrival, determining, by linear regression, a linear regression line in a reference frame using the index of the operations and of the offset values as coordinates, centering the area of the file on an offset determined by a function of the linear regression line for an index greater than those of the operations that made it possible to construct the line.

In this way, it is possible to determine, in real time, a potential future read area. It may be provided for the index greater than those of the operations that made it possible to construct the line to be much greater than the latter, for example situated 10 interval index increments away. In this case, it is possible to deduce an area to be loaded for operations further away in time. It may also be provided for the index greater than those of the operations that made it possible to construct the line to be directly greater than the latter, or slightly greater than the latter, for example situated 2, 3, 4 or 5 interval index increments away, such that a higher probability of a future operation taking place in the preloaded area is achieved. It may be provided for the linear regression line to be chosen to be the one that is the best within the meaning of the method of least squares.

Advantageously, the area of the file is the bin or the group of bins that has reached the predetermined threshold triggering loading.

Preferably, the area of the file to be loaded has a predetermined size ranging from 1 MB to 100 MB.

It may in particular be provided for this size to be greater, or even much greater, than the size of the bin or the group of bins. This makes it possible to take into account a larger area in the file and therefore to improve the chances of a future operation taking place in a preloaded area.

Advantageously, before loading the area of the file to be loaded, it is checked whether at least one portion of the area is already loaded in the memory medium, if at least one portion of the area of the file is already present in the memory medium, the area of the file is not loaded, if not, the area of the file is loaded in the memory medium.

Redundant loading of one and the same area of the file is thus avoided, and space is therefore saved in the cache memory medium.

Advantageously, the method comprises the following steps:

a list that contains the areas that have already been loaded is drawn up, and when an area contained in this list is present on said list for a period greater than a predetermined time, this area is deleted from the list.

This feature is beneficial in particular if the cache system does not allow its content to be known. Once this time period has ended, the preloaded area is deleted from the list, thus making it possible to refresh this same area in the cache. In a high-performance context, it is preferable for this time to be fairly short. It may be provided for this time to be between one and ten seconds, for example between one and five seconds, preferably between one and three seconds. There may also be provision for a longer time, for example up to an hour.

The invention also relates to a device able to implement the method such as described above.

It may be for example a computer, a tablet or a telephone.

The invention also relates to a computer program comprising program code instructions for executing the steps of a method such as described above.

The invention also relates to an electronic recording medium comprising data, in recorded form, for implementing the method such as described above.

Lastly, the invention also relates to a method for making available a file comprising a program such as described above for the purpose of downloading it on a telecommunication network.

BRIEF DESCRIPTION OF THE DRAWINGS

One embodiment of the invention will now be presented, which embodiment is given by way of nonlimiting example and with reference to the appended figures, in which.

DETAILED DESCRIPTION OF THE INVENTION

Figure 1:
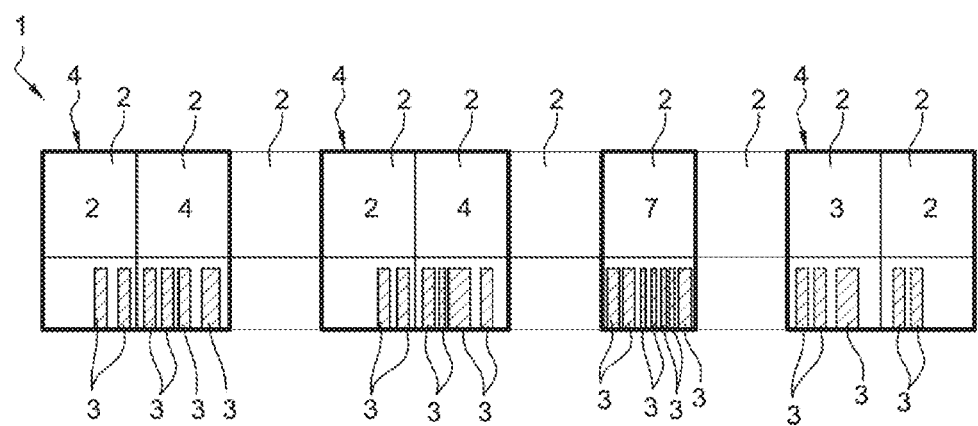
FIG. 1 is a schematic depiction of the bins of a file according to the invention.

One embodiment of the invention will be presented along with two examples showing the advantages of the invention.

It is assumed that the method is implemented in a computer 6 such as a server or a mobile terminal (telephone or tablet) comprising a processor 7, at least one central memory 9 comprising recorded files 1 and at least one cache memory 8.

In one embodiment of the method according to the invention, a file 1 is notionally divided into ten bins 2. All of the bins 2 have the same size. It may for example be provided for each bin to be 1 MB. It may of course be provided for the bins to have a larger size, for example a size of between 1 MB and 100 MB, or even between 1 MB and 50 MB, preferably between 1 MB and 10 MB.

In real time, a sliding sequence of 24 operations 3 is maintained, and each operation 3 is counted in a bin 2. It may of course be provided for the sliding sequence to comprise a smaller number or larger number of operations, for example between 10 and 200, or even between 50 and 150, preferably between 80 and 120.

In the present case, it is seen that two operations 3 have taken place in the first, fourth and tenth bins 2, four operations 3 have taken place in the second and fifth bin 2, seven operations 3 have taken place in the seventh bin 2, three operations 3 have taken place in the ninth bin 2, and no operation has taken place in the third, sixth and eighth bins 2.

In the present case, the threshold for triggering loading of a data area is four operations per bin 2 or group 4 of bins. In FIG. 1, the areas that have reached the threshold for triggering loading are shown with a frame.

In the present case, three groups 4 of bins 2 and one bin 2 have reached this threshold of four operations 3:

a group 4 of bins 2 comprising the first and the second bin 2, in which two and four operations 3 have taken place, respectively, that is to say a total of six operations 3 for the group 4;

a group 4 of bins 2 comprising the third and the fourth bin 2, in which two and four operations 3 have taken place, respectively, that is to say a total of six operations for the bin 2;

the seventh bin 2 in which seven operations 3 have taken place; and a group 4 of bins 2 comprising the ninth and the tenth bin, in which three and two operations 3 have taken place, respectively, that is to say a total of five operations for the group 4.

Figure 2:
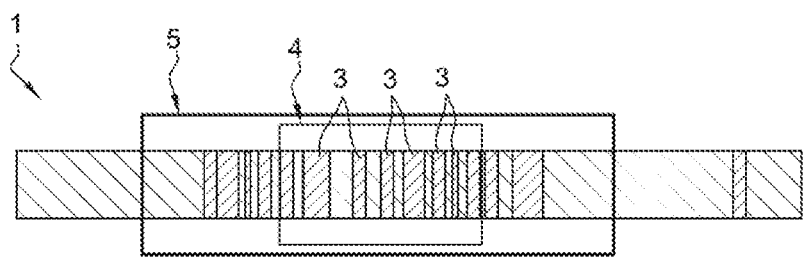
FIG. 2 is a schematic depiction showing the area loaded from a region of the file that has reached the loading threshold.
Figure 3:
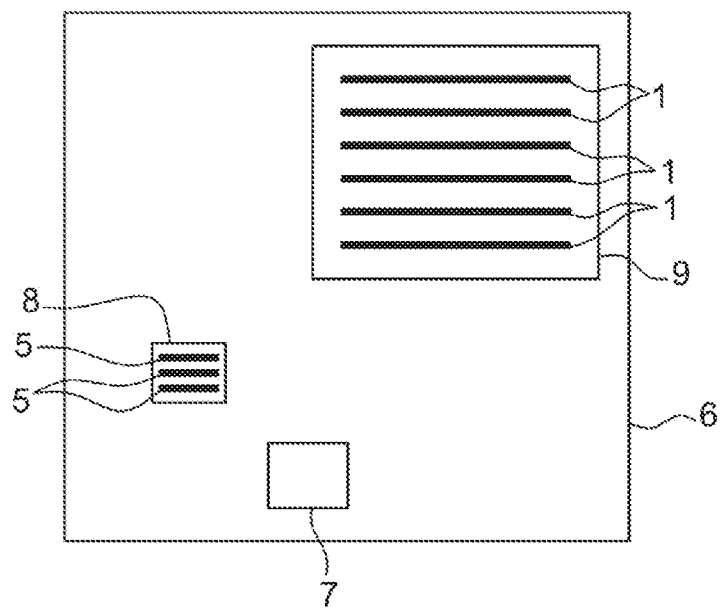
FIG. 3 is a schematic depiction of a device able to implement the method according to the invention.

In the present case, when a group 4 of bins 2 or a bin 2 reaches the loading threshold, the area 5 of the file corresponding to the size of the group 4 of bins 2 or of the bin 2 is loaded in a cache memory medium. Of course, it may be provided for this preloading to take place over a larger area 5 of the file. It may be provided for example for the loading area to have a fixed size that bears no relation to the size of the group 4 of bins 2 or that of the bin 2 (see FIG. 2). For example, the loading area may have a fixed size of between 1 MB and 100 MB, for example between 10 and 80 MB, or even between 20 and 60 MB. It may also be provided for the size of the loading area to be variable according to the size of the group 4 of bins 2 that has reached the loading threshold. It may for example be provided for the size of the area 5 to be preloaded to be proportional to the number of operations that have taken place in the group 4 of bins 2 or the bin 2. It may also be provided for the size of the area 5 to be preloaded to be proportional to the number of bins 2 contained in the group 4 of bins 2 that has reached the threshold for triggering loading.

Once the area 5 has been preloaded in the cache memory medium, future operations requiring access to an area of the file contained in the preloaded area 5 will be performed more quickly, since there will be no need to access the central memory 9.

Example 1

The inventors tested the effectiveness of the method according to the invention by simulating an application requesting small read operations/write operations so as to show a reduction in the number of areas of the file requested by the application that are not yet cached and therefore to reduce the average data access latency.

The system functions read( ) and write( ) are intercepted. In this way, the sequence of all of the read operations and write operations may be analysed so as to trigger the preloading operations.

The efficiency of the method depends above all on its ability to predict, for a given process, the location of the upcoming read operations/write operations.

The cases of use targeted in this example by the method are those of multiple small read operations (typically less than 4 kB) not taken charge of by the optimizations of the operating system and file system. Read operations and/or write operations (in the case "read-modify-write") are typically targeted, these being concentrated in a memory area but locally random or multi-sequential (globally ordered) with local patterns that are complex enough to deceive native optimization mechanisms.

For each file opened (fd) by a given process (pid), a sequence of operations (read operations and write operations) is executed. Each of these operations is described by a triplet:

timestamp, offset (distance between the start of the file and the loaded data), and size of the loaded data.

This information is used to analyse the input/output operations in real time.

An application A is used to simulate inputs and outputs in a controlled environment. Ten sets of parameters for the application A were chosen to simulate different behaviours:

d: destination (source file)

s: kernel for the random number generator

N: number of operations w: operation size

S: size of the distribution area (addition of an unknown to the offset)

L: number of beginnings (multi-sequential)

l: size of the displacement between two operations r: number of repetitions in the multi-sequential case (L>1)

Z: workspace in the file.

These data for the various analyses are shown in table 1 below:

TABLE 1 features of the various tests performed in read mode.

| Analysis number | s | d | Z (in GB) | L | w (in kB) | S | l | N |
|---|---|---|---|---|---|---|---|---|
| 0 | 1 | /fs1/data/ | 1000 | 1 | 4 | 0 | 4 kB | 1000000 |
| 1 | 1 | /fs1/data/ | 1000 | 1 | 128 | 1000 GB | 0 | 100000 |
| 2 | 1 | /fs1/data/ | 1000 | 4 | 4 | 0 | 4 kB | 1000000 |
| 3 | 1 | /fs1/data/ | 1000 | 4 | 4 | 10 MB | 4 kB | 1000000 |
| 4 | 1 | /fs1/data/ | 1000 | 4 | 10 | 10 MB | 10 MB | 1000000 |

TABLE 1-continued features of the various tests performed in read mode.

| Analysis number | s | d | Z (in GB) | L | w (in kB) | S | I | N |
|---|---|---|---|---|---|---|---|---|
| 5 | 1 | /fs1/data/ | 1000 | 4 | 128 | 10 MB | 10 MB | 1000000 |
| 6 | 1 | /fs1/data/ | 1000 | 4 | 4 | 10 MB | 10 MB | 1000000 |
| 7 | 1 | /fs1/data/ | 1000 | 4 | 10 | 50 MB | 10 MB | 1000000 |
| 8 | 1 | /fs1/data/ | 1000 | 4 | 128 | 50 MB | 10 MB | 1000000 |
| 9 | 1 | /fs1/data/ | 1000 | 4 | 4 | 50 MB | 10 MB | 1000000 |

The various analyses correspond to various situations. Analyses 0 (purely sequential) and 1 (purely random) are assumed not to be able to be accelerated in read mode. Specifically, the purely sequential is already correctly taken charge of by the file system used for the tests, and the purely random (over 1 TB) is unpredictable by nature. These examples serve for control purposes and make it possible to measure the "overhead" excess cost in time possibly due to the analysis.

Analysis number 2 corresponds to a situation in which four beginnings of sequential operations are requested by the application A.

Analysis number 3 corresponds to the situation in which four beginnings of sequential operations are requested by the application A, as well as small random local beginnings.

Analyses numbers 4, 5 and 6 correspond to three situations in which four sequential operation beginnings are requested by the application A, as well as small random local beginnings.

Analyses numbers 7, 8 and 9 correspond to three situations in which four sequential operation beginnings are requested by the application A, as well as large random local beginnings.

To start with, the test was performed in read mode. Table 2 lists the times of the ten reference executions (instrumented but not optimized) compared with the executions instrumented and optimized by the method according to the invention.

TABLE 2 results of the tests in read mode.

| Analysis number | Reference time (in seconds) | Time optimized by the method according to the invention (in seconds) | Acceleration factor |
|---|---|---|---|
| 0 | 15.975 | 16.288 | 0.98 |
| 1 | 846.342 | 842.762 | 1.00 |

TABLE 2-continued results of the tests in read mode.

| Analysis number | Reference time (in seconds) | Time optimized by the method according to the invention (in seconds) | Acceleration factor |
|---|---|---|---|
| 2 | 351.198 | 20.392 | 17.22 |
| 3 | 297.440 | 19.968 | 14.90 |
| 4 | 480.971 | 26.066 | 18.45 |
| 5 | 485.708 | 26.349 | 18.43 |
| 6 | 587.903 | 27.445 | 21.42 |
| 7 | 962.705 | 26.675 | 36.09 |
| 8 | 983.861 | 26.615 | 36.97 |
| 9 | 988.505 | 27.832 | 35.52 |

Analyses 2 to 9 significantly demonstrate the effectiveness of the method for achieving an acceleration. Acceleration factors ranging from 17 to 35 times faster are thus achieved when the method according to the invention is used.

Tests were also performed in write mode. The inventors were interested more particularly in cases of non-aligned write operations on a page size of 4 kB. The write mechanism is made up of three main steps: "read—modify—write". Thus, the method developed for small read operations may also help to accelerate the "read—modify—write" cases.

For these tests, only the three first conditions (analyses 0, 1 and 2) were modified so as to comply with the condition of being non-aligned on pages of 4 kB. The test conditions are summarized in table 3.

TABLE 3 features of the various tests performed in write mode.

| Analysis number | s | d | Z (in GB) | L | w (in kB) | S | I | N |
|---|---|---|---|---|---|---|---|---|
| 0 | 1 | /fs2/data/ | 1000 | 1 | 128 | 0 | 128 kB | 1000000 |
| 1 | 1 | /fs2/data/ | 1000 | 1 | 128 | 1000 GB | 0 | 100000 |
| 2 | 1 | /fs2/data/ | 1000 | 4 | 128 | 0 | 128 kB | 1000000 |
| 3 | 1 | /fs2/data/ | 1000 | 4 | 4 | 10 MB | 4 kB | 1000000 |
| 4 | 1 | /fs2/data/ | 1000 | 4 | 10 | 10 MB | 10 MB | 1000000 |
| 5 | 1 | /fs2/data/ | 1000 | 4 | 128 | 10 MB | 10 MB | 1000000 |
| 6 | 1 | /fs2/data/ | 1000 | 4 | 4 | 10 MB | 10 MB | 1000000 |
| 7 | 1 | /fs2/data/ | 1000 | 4 | 10 | 50 MB | 10 MB | 1000000 |

TABLE 3-continued features of the various tests performed in write mode.

| Analysis number | s | d | Z (in GB) | L | w (in kB) | S | I | N |
|---|---|---|---|---|---|---|---|---|
| 8 | 1 | /fs2/data/ | 1000 | 4 | 128 | 50 MB | 10 MB | 1000000 |
| 9 | 1 | /fs2/data/ | 1000 | 4 | 4 | 50 MB | 10 MB | 1000000 |

The execution time and the number of read requests produced in the cases accelerated and not accelerated by the method according to the invention are shown in table 4.

TABLE 4 results of the tests in read mode.

| Analysis number | Non-accelerated times (in seconds) | Accelerated times (in seconds) | Acceleration factor |
|---|---|---|---|
| 0 | 29.675 | 29.302 | 1.01 |
| 1 | 103.328 | 96.358 | 1.07 |
| 2 | 32.372 | 16.932 | 1.91 |
| 3 | 246.489 | 50.951 | 4.84 |
| 4 | 573.069 | 64.410 | 8.90 |
| 5 | 620.080 | 69.194 | 8.96 |
| 6 | 846.823 | 111.298 | 7.61 |
| 7 | 928.966 | 66.551 | 13.96 |
| 8 | 949.924 | 66.236 | 14.34 |
| 9 | 1279.661 | 99.522 | 12.86 |

It may be seen that the method has significantly improved the execution time in the case of tests 2 to 9. This shows that the method has performed an important role by reducing the read time from a cache page. The analyses 0 (purely sequential) and 1 (purely random) have the same behaviour in the case of the read operation. That is to say that, in the cases not able to be accelerated, there is not a significant additional cost due to the analysis.

Example 2

In this example, it is sought to determine the file 1 area 5 that will be loaded based on the trend of the last operations 3 performed in a bin 2 or group 4 of bins 2.

To this end, the N last operations 3 involving this bin 2 or group 4 of bins 2 are identified. These operations are indexed according to their order of arrival. In the present case, N is equal to 20. Thus, these 20 operations have respective indices of 1 to 20 in increments of 1. It may of course be provided for N to be other than 20, for example between 5 and 100.

Figure 4:
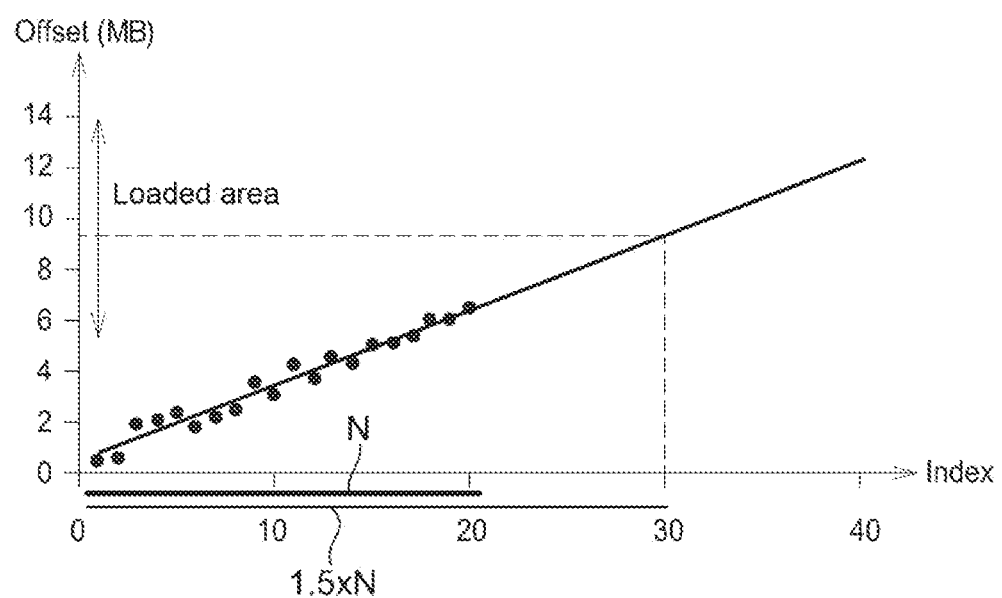
FIG. 4 is a graph showing a linear regression line constructed according to one particular embodiment of the invention.

The graph on which these operations 3 are shown is shown in FIG. 4. The ordinate axis of this graph shows the offsets of the operations 3 in MB, and the abscissa axis shows the index of these operations 3.

Linear regression analysis is performed and the regression line that is the best within the meaning of the method of least squares is used. The equation of the linear regression line is as follows: y=ax+b. The parameters resulting from this calculation make it possible to infer a potential area for future read operations by evaluating the function of this line for a higher index comprising for example the operations ranging up to 1.5×N. The area 5 to be loaded is centered on the offset corresponding to the index predicted by the regression line (or equation) for the 1.5×N operation.

The size of the loaded area (represented by the double-headed arrow in the graph) is predetermined. In the present case, it is around 8 MB.

The invention is not limited to the embodiments presented, and other embodiments will be clearly apparent to a person skilled in the art.

What is claimed is:

1. A method for preloading data of a file, comprising the following steps:
    defining a plurality of bins of predetermined sizes in a file,
    for each input and/or output operation executed on the file, determining the bin involved in the operation,
    counting a number of input and/or output operations executed in each of the plurality of bins of the file by taking into account only a predetermined number of last operations on the whole file,
    when a sum of operations counted in one of the plurality of bins is greater than a predetermined threshold, loading, in a memory medium, at least one area of the file determined on the basis of this bin, and
    wherein the area of the file to be loaded on the memory medium is selected and sized to be centered on a median of positions of at least some of the operations involving the first one of the plurality of bins or a group of bins.

2. The method according to claim 1, furthermore comprising the following steps:
    identifying at least one group of adjacent bins for which at least one input and/or output operation has been counted, and
    when a sum of the operations counted in the group of adjacent bins is greater than the predetermined threshold, loading, in the memory medium, at least one area of the file determined on the basis of this group of adjacent bins.

3. The method according to claim 1, implemented during the execution of an application.

4. The method according to claim 1, wherein the predetermined number of last operations taken into account is an integer between 10 and 1000.

5. The method according to claim 1, wherein the size of the plurality of bins is between 1 MB and 100 MB.

6. The method according to claim 1, wherein the plurality of bins have the same size.

7. The method according to claim 1, wherein the predetermined threshold triggering loading is between 2 and 100 operations.

8. A method for preloading data of a file, comprising the following steps:
    defining a plurality of bins of predetermined sizes in a file,
    for each input and/or output operation executed on the file, determining the bin involved in the operation,
    counting a number of input and/or output operations executed in each of the plurality of bins of the file by taking into account only a predetermined number of last operations on the whole file,
    when a sum of operations counted in one of the plurality of bins is greater than a redetermined threshold loading, in a memo medium at least one area of the file determined on the basis of this bin, and wherein a position of the area of the file is determined as follows:

identifying a predetermined number of last input and/or output operations involving the first one of the plurality of bins or a group of bins that has reached the predetermined threshold for triggering loading and indexing them according to their order of arrival to create an index of the operations, determining, by linear regression, a linear regression line in a reference frame using the index of the operations and of offset values as coordinates, centering the area of the file on an offset determined by a function of the linear regression line for an index greater than those of the operations that made it possible to determine the line, selecting and sizing the area of the file by centering it on an offset determined by a function of the linear regression line for an index greater than those of the operations that made it possible to determine the line.

9. The method according to claim 1, wherein the area of the file is the first one of the plurality of bins or a group of bins that has reached the predetermined threshold triggering loading.

10. The method according to claim 1, wherein the area of the file to be loaded has a predetermined size ranging from 1 MB to 100 MB.

11. The method according to claim 1, wherein:
before loading the area of the file, the area is checked whether at least one portion of the area is already loaded in the memory medium,
if at least one portion of the area of the file is already present in the memory medium, the area of the file is not loaded,
if not, the area of the file is loaded in the memory medium.

12. The method according to claim 1, wherein:
a list that contains the areas that have already been loaded is drawn up, and
when an area contained in this list is present on said list for a period greater than a predetermined time, this area is deleted from the list.

13. A device able to implement the method according to claim 1.

14. A computer program comprising program code instructions for executing the steps of a method according to claim 1 wherein said program is executed on a computer.

15. A computer-readable electronic recording medium comprising program code instructions, in recorded form, for implementing the method according to claim 1.

16. The method of claim 14 wherein a file comprising the program is made available for downloading the file on a telecommunication network.

17. The method of claim 4 wherein the integer is between 10 and 200.

18. The method of claim 5 wherein the size of the bins is between 1 MB and 10 MB.

19. The method according to claim 7, wherein the predetermined threshold triggering loading is between 4 and 10 operations.

20. The method according to claim 1 wherein defining the plurality of bins of predetermined sizes in the file includes defining a fixed spatial position of each bin in the file.

21. The method according to claim 1 wherein each of the plurality of bins is a continuous section of the file.

* * * * *